(12) United States Patent
Li et al.

(10) Patent No.: US 10,939,284 B1
(45) Date of Patent: Mar. 2, 2021

(54) 5G-BASED COMMUNICATION METHOD FOR INDUSTRIAL APPARATUS AND MICROPROCESSOR FOR 5G-BASED COMMUNICATION

(71) Applicant: Shenzhen Jingjiang Yunchuang Technology Co., Ltd., Shenzhen (CN)

(72) Inventors: Jun-Qi Li, Shenzhen (CN); Juka Oh, Shenzhen (CN); Qing Liu, Shenzhen (CN); Xue-Qin Zhang, Shenzhen (CN); Shang-Hua Hao, Shenzhen (CN)

(73) Assignee: Shenzhen Jingjiang Yunchuang Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/747,283

(22) Filed: Jan. 20, 2020

(30) Foreign Application Priority Data

Aug. 30, 2019 (CN) .......................... 201910818875.5

(51) Int. Cl.
| | |
|---|---|
| *H04M 3/00* | (2006.01) |
| *H04B 17/00* | (2015.01) |
| *H04W 8/22* | (2009.01) |
| *G06F 16/22* | (2019.01) |
| *G06F 16/25* | (2019.01) |

(52) U.S. Cl.
CPC .............. *H04W 8/22* (2013.01); *G06F 16/22* (2019.01); *G06F 16/258* (2019.01)

(58) Field of Classification Search
None
See application file for complete search history.

(56) References Cited

U.S. PATENT DOCUMENTS

| | | | | |
|---|---|---|---|---|
| 2016/0110728 | A1* | 4/2016 | Garcia | G06Q 30/0201 705/7.29 |
| 2018/0368068 | A1* | 12/2018 | Deorah | G06Q 50/30 |
| 2019/0297605 | A1* | 9/2019 | Kim | H04L 5/0094 |

* cited by examiner

*Primary Examiner* — Erika A Washington
(74) *Attorney, Agent, or Firm* — ScienBiziP, P.C.

(57) ABSTRACT

A 5G-based communication method for an industrial apparatus can be implemented in industrial apparatus during manufacturing operations, and a microprocessor. The industrial apparatus can collect data sets concerning itself, generate a 5G signal containing the data sets, and send the 5G signal to the microprocessor. The microprocessor determines a communication channel for the microprocessor according to the identification of the industrial apparatus in the data set, and can find a data processing rule, a data storage rule, and a data emission rule corresponding to the communication channel in a relationship table. The data is processed accordingly enabling a safe, efficient, and convenient transmission of data sets between the microprocessor and the industrial apparatus.

18 Claims, 7 Drawing Sheets

| Communication channel | Data processing rule | Data storage rule | Data emission rule |
|---|---|---|---|
| Communication channel 1 | Data processing rule 1 | Data storage rule 1 | Data emission rule 1 |
| Communication channel 2 | Data processing rule 2 | Data storage rule 2 | Data emission rule 2 |
| ... | ... | ... | ... |

5G-BASED COMMUNICATION METHOD FOR INDUSTRIAL APPARATUS AND MICROPROCESSOR FOR 5G-BASED COMMUNICATION

CROSS-REFERENCE TO RELATED APPLICATIONS

This application claims priority to Chinese Patent Application No. 201910818875.5 filed on Aug. 30, 2019, the contents of which are incorporated by reference herein.

FIELD

The subject matter herein generally relates to a communication field, especially to a 5G-based communication method for industrial apparatus and a microprocessor for 5G-based communication.

BACKGROUND

The items of industrial apparatus are connected to each other by CAN bus, PROFIBUS bus, MODUBUS bus, RS232, RS485, TCP/IP Network Line. Because of the low latency, universality, low power consumption, high security, transmission efficiency, and convenience of 5G communication method, the wireless data transmission of industrial apparatus through 5G transmission technology is beneficial.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 5 is a schematic diagram of an embodiment of a relationship table utilized by the method of FIG. 1.

DETAILED DESCRIPTION

Figure 1:
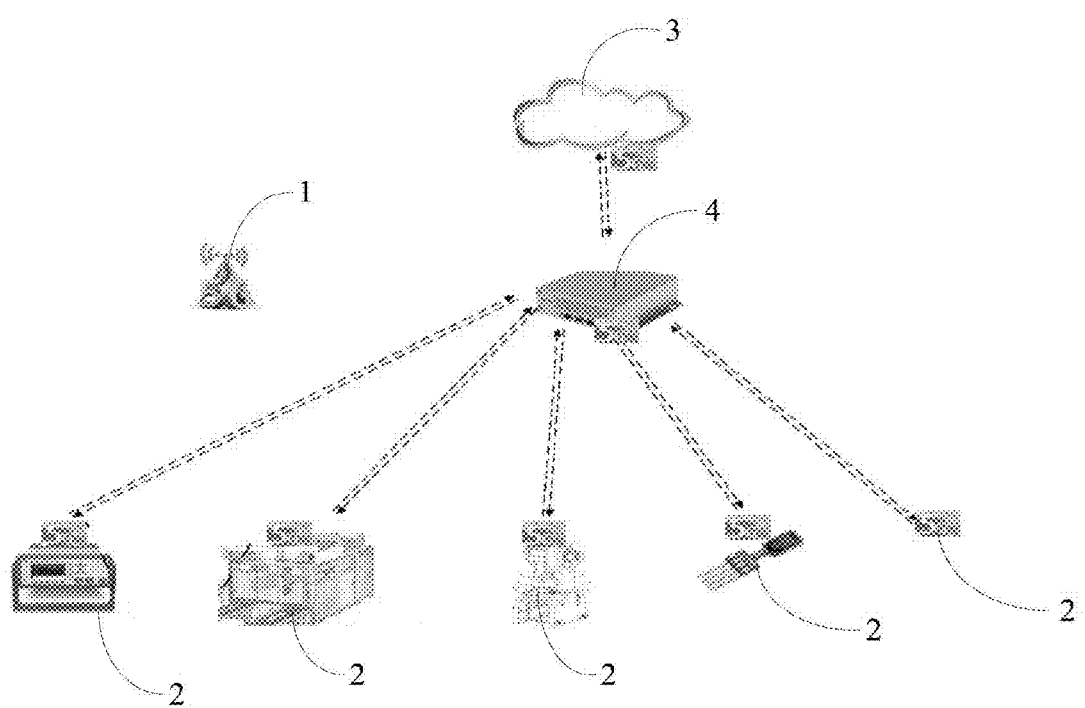
FIG. 1 is a block diagram of an embodiment of a running environment of a 5G-based communication method for industrial apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates a running environment of a 5G-based communication method for industrial apparatus. The method is applied in an environment composed of a base station 1, a microprocessor 2, a cloud platform 3, and an industrial apparatus 4. In one embodiment, the base station 1 sends a 5G signal to cover an area where the base station 1 is located. The industrial apparatus 4 can communicate with the microprocessor 2 by the 5G signal sent by the base station 1. In one embodiment, the base station 1 can be deployed according to an area of a factory floor. For example, the area of the factory floor is divided into a number of sub-regions and each of the number of sub-regions defines one base station 1. In one embodiment, the sub-region in which a quantity of the industrial apparatus 4 exceeds four defines two base stations 1. In one embodiment, the microprocessor 2 receives a first signal sent by the industrial apparatus 4 and sends the first signal to the cloud platform 3, and receives a control signal sent by the industrial apparatus 4 and sends the control signal to the industrial apparatus 4 to control the industrial apparatus 4 according to the control signal. In one embodiment, the base station 1 is a 5G base station. The microprocessor 2 is a 5G microprocessor. The cloud platform 3 is a cloud server. The industrial apparatus 4 is an instrumentation or a manufacturing apparatus. For example, the manufacturing apparatus can be a robot arm or a robot.

Figure 2:
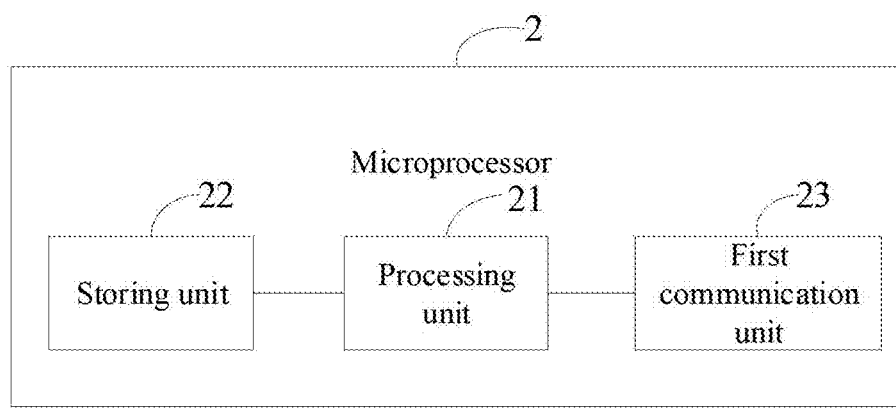
FIG. 2 is a block diagram of an embodiment of a microprocessor of the method of FIG. 1.

FIG. 2 illustrates the microprocessor 2. In one embodiment, the microprocessor 2 includes a processing unit 21, a storing unit 22, a first communication unit 23. The processing unit 21 connects to the storing unit 22 and the first communication unit 23. In one embodiment, the microprocessor 2 communicates with the industrial apparatus 4 by the first communication unit 23. In one embodiment, the first communication unit 23 is an omnidirectional antenna or an array antenna. The microprocessor 2 communicates with the cloud platform 3 by a network. In one embodiment, the network can be enterprise network or Internet.

The processing unit 21 acquires a first signal sent by the industrial apparatus 3, analyses, processes, and stores the first signal. In one embodiment, the processing unit 21 can be a central processing unit, or a common processor, a digital signal processor, a dedicated integrated circuit, ready-made programmable gate arrays or other programmable logic devices, discrete door or transistor logic devices, discrete hardware components, and so on. In another embodiment, the processing unit 21 can be any conventional processor. The processing unit 21 can also be a control center of the microprocessor 2, using various interfaces and lines to connect the various parts of the microprocessor 2. The storing unit 22 stores data of the microprocessor 2. In at least one exemplary embodiment, the storing unit 22 can include various types of non-transitory computer-readable storage mediums. For example, the storing unit 22 can be an internal storage system of the microprocessor 2, such as a flash memory, a random access memory (RAM) for temporary storage of information, and/or a read-only memory (ROM) for permanent storage of information. In another embodiment, the storing unit 22 can also be an external storage system, such as a hard disk, a storage card, or a data storage medium.

Figure 3:
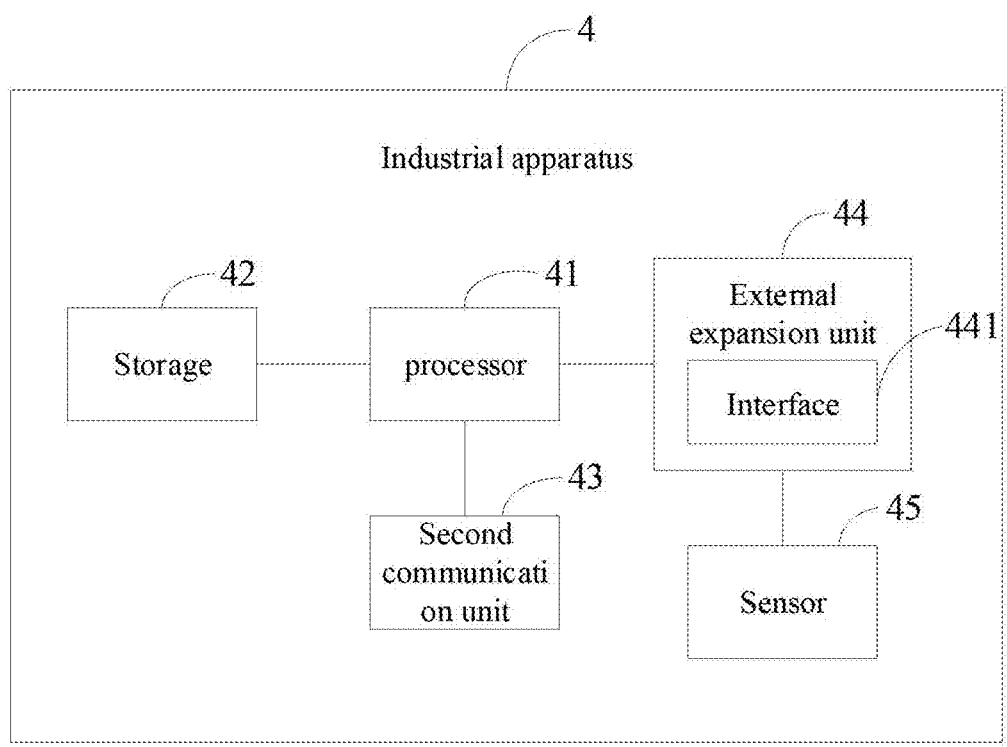
FIG. 3 is a block diagram of an embodiment of an item of industrial apparatus of FIG. 1.
Figure 4:
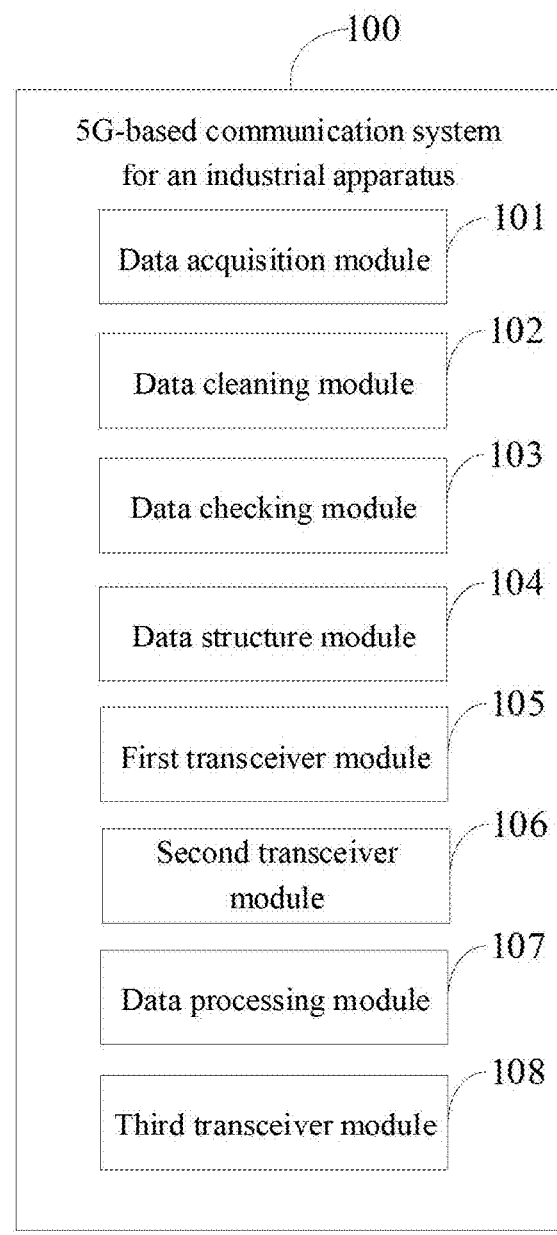
FIG. 4 is a block diagram of an embodiment of a 5G-based communication system for industrial apparatus.

FIG. 3 illustrates the industrial apparatus 4. The industrial apparatus 4 includes a processor 41, a storage 42, a second communication unit 43, an external expansion unit 44, and at least one sensor 45. In one embodiment, the processor 41 connects to the storage 42, the second communication unit 43, and the external expansion unit 44. The external expansion unit 44 connects to the sensor 45. In one embodiment, the sensor 45 can be a temperature sensor, a pressure sensor, a position sensor, or a distance sensor. The second communication unit 43 can be an omnidirectional antenna or an array antenna. In one embodiment, the external expansion unit 44 includes an interface 441 connecting to the sensor 45. In one embodiment, the external expansion unit 44 includes a variety of different types of communication protocols, enabling the external expansion unit 44 to communicate with a variety of sensors with different types of communication protocols. In one embodiment, the interface 441 can be a serial signal interface or a parallel signal interface. For example, the interface 441 can be a CAN interface, a PROFIBUS interface, a MODUBUS interface, an EPA interface, an ETHERCAT interface, an ETHERNET POWERLINK interface, an RS232 interface, an RS485 interface, or a TCP/IP interface.

In one embodiment, the interface 441 connects to sensors 45 with different types of communication protocols, and converts data collected from the sensors 45 into a target data recognized by the processor 41. In one embodiment, the interface 441 collects data signal by the CAN interface, the PROFIBUS interface, the MODUBUS interface, the EPA interface, the ETHERCAT interface, the ETHERNET POWERLINK interface, the RS232 interface, the RS485 interface, or the TCP/IP interface. The processor 41 converts the data signal into 5G signal, and sends the 5G signal to the microprocessor 2 by the second communication unit 42. In one embodiment, the processor 41 can also be a control center of the industrial apparatus 4, using various interfaces and lines to connect the various parts of the industrial apparatus 4. The storage 2 stores data of the industrial apparatus 4. In at least one exemplary embodiment, the storage 42 can include various types of non-transitory computer-readable storage mediums. For example, the storage 2 can be an internal storage system of the industrial apparatus 4, such as a flash memory, a random access memory (RAM) for temporary storage of information, and/or a read-only memory (ROM) for permanent storage of information. In another embodiment, the storage 2 can also be an external storage system, such as a hard disk, a storage card, or a data storage medium.

FIG. 2 illustrates 5G-based communication system 100 for industrial apparatus. In the embodiment, the 5G-based communication system 100 includes one or more modules, which are running in the microprocessor 2 and the industrial apparatus 4. The 5G-based communication system 100 includes a data acquisition module 101, a data cleaning module 102, a data checking module 103, a data structure module 104, a first transceiver module 105, a second transceiver module 106, a data processing module 107 and a third transceiver module 108. The modules 101-108 of the 5G-based communication system 100 can be collections of software instructions. In present embodiment, the data acquisition module 101, the data cleaning module 102, the data checking module 103, the data structure module 104, and the first transceiver module 105 are stored in the storage 42 of the industrial apparatus 4 and executed by the processor 41 of the industrial apparatus 4. The second transceiver module 106, the data processing module 107, and the third transceiver module 108 are stored in the storing unit 22 of the microprocessor 2 and executed by the processing unit 21 of the microprocessor 2. In another embodiment, the data acquisition module 101, the data cleaning module 102, the data checking module 103, the data structure module 104, and the first transceiver module 105 are program segments or code in the processor 41 of the industrial apparatus 4. The second transceiver module 106, the data processing module 107, and the third transceiver module 108 are program segments or code in the processing unit 21 of the microprocessor 2.

The data acquisition module 101 collects data to obtain a collected data set.

In one embodiment, when the interface 441 of the external expansion unit 44 is a CAN interface, the data acquisition module 101 can collect the collected data set from the sensor 45 by a CAN bus. In one embodiment, when the interface 441 of the external expansion unit 44 is a PROFIBUS interface, the data acquisition module 101 can collect the collected data set from the sensor 45 by a PROFIBUS bus. In one embodiment, when the interface 441 of the external expansion unit 44 is a MODUBUS interface, the data acquisition module 101 can collect the collected data set from the sensor 45 by a MODUBUS bus. In one embodiment, when the interface 441 of the external expansion unit 44 is an EPA interface, the data acquisition module 101 can collect the collected data set from the sensor 45 by an EPA bus. In one embodiment, when the interface 441 of the external expansion unit 44 is an ETHERCAT interface, the data acquisition module 101 can collect the collected data set from the sensor 45 by an ETHERCAT bus. In one embodiment, when the interface 441 of the external expansion unit 44 is an ETHERNET POWERLINK interface, the data acquisition module 101 can collect the collected data set from the sensor 45 by an ETHERNET POWERLINK bus. In one embodiment, when the interface 441 of the external expansion unit 44 is an RS232 interface, the data acquisition module 101 can collect the collected data set from the sensor 45 by an RS232 bus. In one embodiment, when the interface 441 of the external expansion unit 44 is an RS485 interface, the data acquisition module 101 can collect the collected data set from the sensor 45 by an RS485 bus. In one embodiment, when the interface 441 of the external expansion unit 44 is a TCP/IP interface, the data acquisition module 101 can collect the collected data set from the sensor 45 by a TCP/IP bus. In another embodiment, the data acquisition module 101 collects data from the industrial apparatus 4.

The data cleaning module 102 cleans the collected data set.

In one embodiment, because of the collected data includes incomplete data, duplicate data, default data, redundant data, and other sub-optimal data, an analysis based on the collected data produces incorrect results. Therefore, the collected data needs to be cleaned to avoid incorrect results of the collected data.

In one embodiment, the data cleaning module 102 removes redundancy, fragmentation, and noise from the collected data according to a preset cleaning rule algorithm. In one embodiment, the preset cleaning rule algorithm can be a removing missing value method, a mean filling method, or a hot card filling method. In one embodiment, the removing missing value method is to directly drop samples with missing values from the collected data set. The mean filling method is to divide the collected data set into groups according to a property correlation coefficient of the missing value in the collected data set, calculate a mean value of each group, and insert the mean as the missing value. The hot card filling method is to find an object in a database that has a value similar to the missing value, and then fill the value of the object into the missing value.

In one embodiment, the data cleaning module 102 classifies and aggregates the collected data set according to a predefined classification rule and a characteristics of the collected data set to obtain one or more sets data collections with the same type of characteristics.

The data checking module 103 determines whether the collected data set is compliant.

In one embodiment, the data checking module 103 sets different compliance rules for the collected data set collected from different sensors 45 or industrial apparatus 4, and determines whether the collected data set is compliant according to the corresponding compliance rule. In one embodiment, the compliance rule includes determining whether a numerical range of the collected data set is in a preset range or determining whether a field length of the collected data set is in a preset length. In one embodiment, the data checking module 103 determines that the collected data set is in compliance when the numerical range of the collected data set is in the preset range and the field length of the collected data set is in a preset length. In one embodiment, the data checking module 103 discards the collected data set when the collected data set is not in compliance.

The data structure module 104 encapsulates the collected data set to form a structured target data set when the collected data set is compliant.

The data structure module 104 encapsulates the collected data set to form the structured target data set according to data head 0 format and data head 1 format. In one embodiment, the collected data set includes numerical data and control data. The numerical data is a specific value. For example, the numerical data can be a temperature value collected from a temperature sensor or a humidity value collected from a humidity sensor. In one embodiment, the control data is a command to a platform, to a sensor, or to an industrial apparatus. In one embodiment, the data head 0 format includes a numerical data head 0 format and a control data head 0 format. In one embodiment, the numerical data head 0 format includes, but is not limited to, a data ID, a data species, a custom enumeration type, a data name, a data description, a data group ID, a data type, a measurement unit of the data, a byte length of the data, an upper limit value of the data, a center value of the data, a missing identity of the data, a default access property of the data, a data generation time, and a custom data property. In one embodiment, in the default access property of the data, R indicates read-only, W indicates write-only, RW indicates read & write. In one embodiment, the data structure module 104 encapsulates the collected data set to form the structured target data set by adding the data ID, the data species, the custom enumeration type, the data name, the data description, the data group ID, the data type, the measurement unit of the data, the byte length of the data, the upper limit value of the data, the center value of the data, the missing identity of the data, the default access property of the data, the data generation time, and the custom data property.

In one embodiment, the control data head 0 format includes, but is not limited to, a data ID, a data species, a custom enumeration type, a control command name, a control command function description, a control command, a target device ID, a command interface, and a quantity of command parameters. The command parameters can be a command parameter 1, a command parameter 2, to command parameter n, where n is a positive integer that is more than one. The data structure module 104 encapsulates the collected data set to form the structured target data set by adding the data ID, the data species, the custom enumeration type, the control command name, the control command function description, the control command, the target device ID, the command interface, and the quantity of command parameters.

In one embodiment, the data head 1 format includes, but is not limited to, a device ID, a device type, a device name, a device function. The data structure module 104 encapsulates the collected data set to form the structured target data by adding the device ID, the device type, the device name, and the device function.

The first transceiver module 105 generates a 5G signal containing the structured target data set, and sends the 5G signal containing the t structured target data set to the microprocessor 2. In one embodiment, the first transceiver module 105 converts a CAN BUS signal, a PROFIBUS BUS signal, a MODUBUS BUS signal, an EPA BUS signal, an ETHERCAT BUS signal, an ETHERNET POWERLINK BUS signal, an RS232 BUS signal, an RS485 BUS signal, or a TCP/IP BUS signal containing the structured target data set into the 5G signal containing the structured target data set.

In one embodiment, the first transceiver module 105 also receives a second 5G signal, and converts the 5G signal into the CAN BUS signal, the PROFIBUS BUS signal, the MODUBUS BUS signal, the EPA BUS signal, the ETHERCAT BUS signal, the ETHERNET POWERLINK BUS signal, the RS232 BUS signal, the RS485 BUS signal, or the TCP/IP BUS signal.

The second transceiver module 106 acquires the 5G signal containing the structured target data set sent by the industrial apparatus 4.

In one embodiment, the second transceiver module 106 acquires the 5G signal containing the structured target data set by the base station 1 and the first communication unit 23 of the microprocessor 2. In another embodiment, the base station 1 is set in the microprocessor 2, and the second transceiver module 106 acquires the 5G signal containing the structured target data set by the base station 1 set in the microprocessor 2.

The data processing module 107 acquires the structured target data set from the 5G signal, cleans the structured target data set, and determines whether the structured target data set is in compliance.

In one embodiment, the data processing module 107 removes redundancy, fragmentation, and noise from the structured target data set according to the preset cleaning rule algorithm. In one embodiment, the preset cleaning rule algorithm can be the removing missing value method, the mean filling method, or the hot card filling method, as previously described.

In one embodiment, the data processing module 107 sets different compliance rules for the structured target data set from different items of industrial apparatus 4, and determines whether the structured target data set is compliant according to the corresponding compliance rule. In one embodiment, the compliance rules include determining whether the numerical range of the structured target data set is in the preset range or determining whether the field length of the structured target data set is in the preset length. In one embodiment, the data checking module 103 determines the structured target data set is in compliance when the numerical range of the structured target data set is in the preset range and the field length of the structured target data set is in the preset length. In one embodiment, the data processing module 107 discards the structured target data set when the structured target data set is not in compliance.

In one embodiment, different items of industrial apparatus 4 communicate with the microprocessor 2 by different communication channels. The data processing module 107 determines the communication channel for the microprocessor 2 communicating with the industrial apparatus 4 according to an identification of the industrial apparatus 4 carried in the structured target data set, and finds a relationship table 200 based on the communication channel to determine a data processing rule, a data storage rule, and a data emission rule corresponding to the communication channel, and processes the structured target data set according to the data processing rule, the data storage rule, and the data emission rule. In one embodiment, the relationship table 200 defines different relationships between the communication channel, the data processing rule, the data storage rule, and the data emission rule.

FIG. 5 illustrates the relationship table 200. The relationship table 200 includes the communication channels, the data processing rules, the data storage rules, and the data emission rules, and defines the different relationships between the communication channel, the data processing rule, the data storage rule, and the data emission rule. In one embodiment, the data processing rule is a rule for processing the structured target data set. The data storage rule is a rule for storing the structured target data set or storing a data processing result obtained after processing the structured target data set according to the data processing rule. In one embodiment, the data emission rule is a rule for sending the structured target data set to the cloud platform 3, the industrial apparatus 4, or other device. In one embodiment, the structured target data set can be a temperature data sent by the industrial apparatus 4, and the data processing module 107 determines the communication channel for the microprocessor 2 communicating with the industrial apparatus 4 according to an identification of the industrial apparatus 4 carried in the temperature data, and refers to the relationship table 200 based on the communication channel to find the data processing rule that compares the temperature data with a preset temperature range. The temperature data is sent to the cloud platform 3 when the temperature data is in the preset temperature range, and an alarm instruction is generated when the temperature data is not in the preset temperature model, the alarm instruction being sent to an alarm device. The data processing module 107 finds the relationship table 200 based on the communication channel to determine the data storage rule for storing the temperature data in the cloud platform 3 when the temperature data is in the preset temperature range. The data processing module 107 finds the relationship table 200 based on the communication channel to determine the data emission rule for sending the temperature data to the cloud platform 3 when the temperature data is within the preset temperature range.

In one embodiment, the data processing module 107 encapsulates the structured target data set according to a data head 2 format. The third transceiver module 108 sends the encapsulated data to the cloud platform 3. In one embodiment, the data head 2 format includes, but is not limited to, a product name, a project name, a process number, and a production line number. In one embodiment, the data processing module 107 adds the product name, the project name, the process number, and the production line number to the structured target data set. For example, for a mobile phone manufacturer producing a mobile phone, processes of the mobile phone include housing processing, electronic component assembly and testing, and product packaging. The housing processing data can be acquired by a housing processing industrial apparatus, and the electronic component assembly and testing data can be acquired by an assembly testing device, and the product packaging data can be acquired by a packaging device. The data processing module 107 encapsulates the housing processing data according to "product name, housing processing, fifth production line", and encapsulates the electronic component assembly testing data according to "product name, electronic component assembly testing, second production line", and encapsulates the product packaging data according to "product name, product packaging, first production line". In one embodiment, the third transceiver module 108 sends the encapsulated data to the cloud platform 3 by the network.

The cloud platform 3 receives the structured target data set sent by the microprocessor 2, and encapsulates the structured target data set sent by the microprocessor 2 according to a data head 3 format. In one embodiment, the data head 3 format includes, but is not limited to, a product type, an industry, a company name, and a company address. In one embodiment, the cloud platform 3 encapsulates the structured target data set sent by the microprocessor 2 by adding the product type, the industry, the company name, and the company address. For example, the microprocessor 2 sends production and testing data from a 3D metal printing material factory in Shenzhen to the cloud platform 3, and the cloud platform 3 encapsulates the production and testing data by adding "metal printing material, production, 3D metal printing material factory, Shenzhen".

In one embodiment, the third transceiver module 108 receives a control command sent by the cloud platform 3, and the second transceiver module 106 sends the control command by a 5G signal format to the industrial apparatus 4 to control the industrial apparatus 4 according to the control command.

In present disclosure, the industrial apparatus 4 collects data set, generates a 5G signal containing the data set, and sends the 5G signal to the microprocessor 2. The microprocessor 2 determines the communication channel for the microprocessor 2 communicating with the industrial apparatus 4 according to an identification of the industrial apparatus 4 carried in the data set, and finds in a relationship table 200 based on the communication channel to determine a data processing rule, a data storage rule, and a data emission rule corresponding to the communication channel. The data set is processed according to the data processing rule, the data storage rule, and the data emission rule, thus enabling safe, efficient, and convenient transmission of data between the microprocessor 2 and the industrial device 4.

Figure 6:
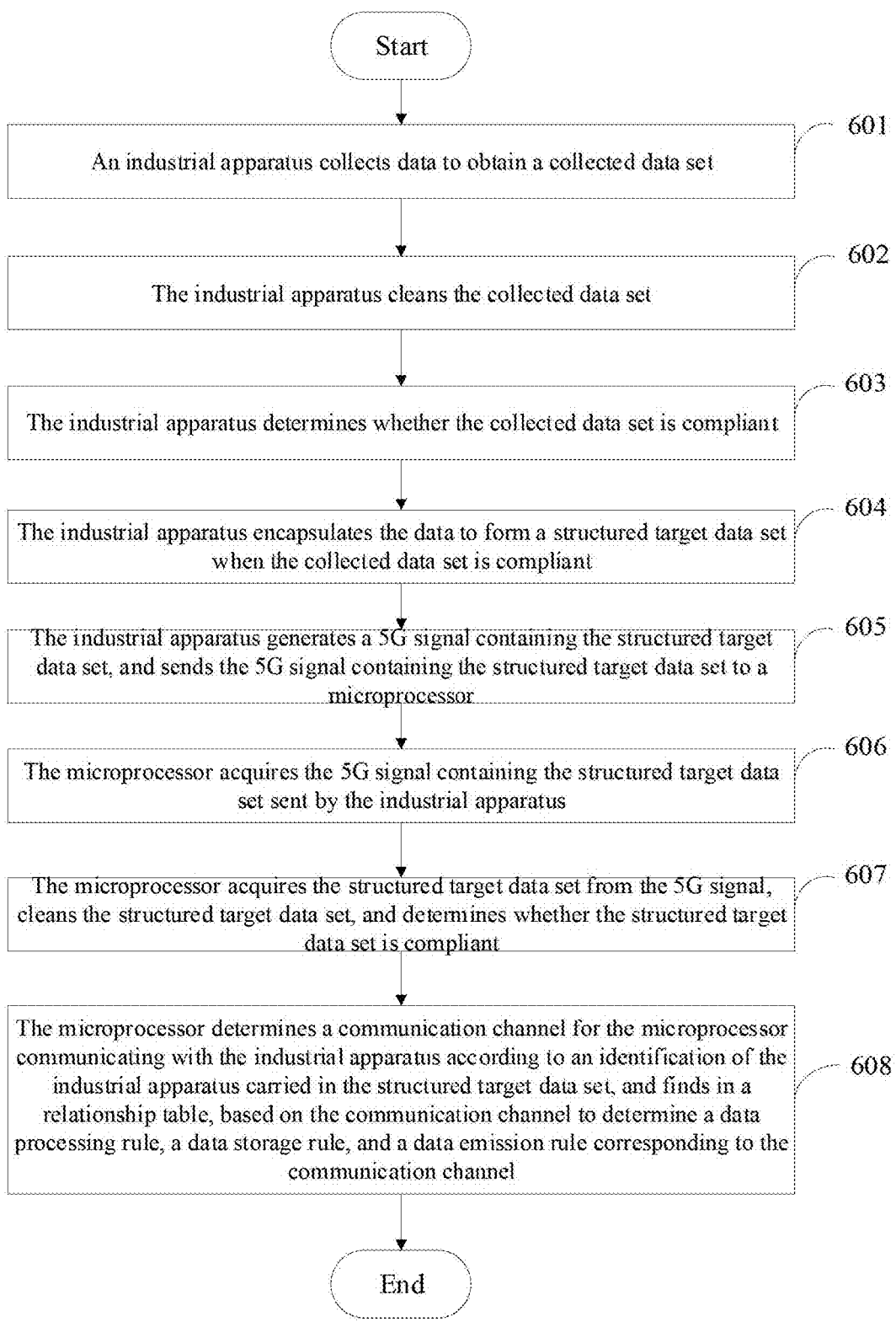
FIG. 6 is a flowchart of an embodiment of the 5G-based communication method for industrial apparatus of FIG. 1.

FIG. 6 illustrates a flowchart of an embodiment of a 5G-based communication method for industrial apparatus. The 5G-based communication method is provided by way of example, as there are a variety of ways to carry out the method. The method described below can be carried out using the configurations illustrated in FIGS. 1-5, for example, and various elements of these figures are referenced in explaining the example method. Each block shown in FIG. 6 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 601.

At block 601, an industrial apparatus collects data to obtain a collected data set.

In one embodiment, when an interface of an external expansion unit of the industrial apparatus is a CAN interface, the industrial apparatus can collect the collected data set from a sensor of the industrial apparatus by a CAN bus. In one embodiment, when the interface of the external expansion unit is a PROFIBUS interface, the industrial apparatus can collect the collected data set from the sensor by a PROFIBUS bus. In one embodiment, when the interface of the external expansion unit is a MODUBUS interface, the industrial apparatus can collect the data from the sensor by a MODUBUS bus. In one embodiment, when the interface of the external expansion unit is an EPA interface, the industrial apparatus can collect the collected data set from the sensor by an EPA bus. In one embodiment, when the interface of the external expansion unit is an ETHERCAT interface, the industrial apparatus can collect the collected data set from the sensor by an ETHERCAT bus. In one embodiment, when the interface of the external expansion unit is an ETHERNET POWERLINK interface, the industrial apparatus can collect the collected data set from the sensor by an ETHERNET POWERLINK bus. In one embodiment, when the interface of the external expansion unit is an RS232 interface, the industrial apparatus can collect the collected data set from the sensor by an RS232 bus. In one embodiment, when the interface of the external expansion unit is an RS485 interface, the industrial apparatus can collect the collected data set from the sensor by an RS485 bus. In one embodiment, when the interface of the external expansion unit is a TCP/IP interface, the industrial apparatus can collect the collected data set from the sensor by a TCP/IP bus. In another embodiment, the industrial apparatus collects the collected data set from the industrial apparatus.

At block 602, the industrial apparatus cleans the collected data set.

In one embodiment, the industrial apparatus removes redundancy, fragmentation, and noise from the collected data set according to a preset cleaning rule algorithm. In one embodiment, the preset cleaning rule algorithm can be a removing missing value method, a mean filling method, or a hot card filling method as previously described.

In one embodiment, the industrial apparatus classifies and aggregates the collected data set according to a predefined classification rule and a characteristics of the collected data set to obtain one or more collected sets of data with the same type of characteristics.

At block 603, the industrial apparatus determines whether the collected data set is compliant.

In one embodiment, the industrial apparatus sets different compliance rules for the collected data set collected from different sensors or industrial apparatus, and determines whether the collected data set is compliant according to the corresponding compliance rule. In one embodiment, the compliance rule includes determining whether a numerical range of the collected data set is in a preset range or determining whether a field length of the collected data set is in a preset length. In one embodiment, the industrial apparatus determines that the collected data set is in compliance when the numerical range of the collected data set is in the preset range and the field length of the collected data set is in a preset length. In one embodiment, the industrial apparatus discards the collected data set when the collected data set is not compliant.

At block 604, the industrial apparatus encapsulates the data to form a structured target data set when the collected data set is compliant.

The industrial apparatus encapsulates the data to form the structured target data set according to a data head 0 format and a data head 1 format. In one embodiment, the collected data set includes numerical data and control data. The numerical data is a specific value. For example, the numerical data can be a temperature value collected from a temperature sensor or a humidity value collected from a humidity sensor. In one embodiment, the control data is a control command to a platform, a sensor, or the industrial apparatus. In one embodiment, the data head 0 format includes a numerical data head 0 format and a control data head 0 format. In one embodiment, the numerical data head 0 format includes, but is not limited to, a data ID, a data species, a custom enumeration type, a data name, a data description, a data group ID, a data type, a measurement unit of the data, a byte length of the data, an upper limit value of the data, a center value of the data, a missing identity of the data, a default access property of the data, a data generation time, and a custom data property. In one embodiment, in the default access property of the data, R indicates read-only, W indicates write-only, and RW indicates read & write. In one embodiment, the industrial apparatus encapsulates the data to form the structured target data set by adding the data ID, the data species, the custom enumeration type, the data name, the data description, the data group ID, the data type, the measurement unit of the data, the byte length of the data, the upper limit value of the data, the center value of the data, the missing identity of the data, the default access property of the data, the data generation time, and the custom data property.

In one embodiment, the control data head 0 format includes, but is not limited to, a data ID, a data species, a custom enumeration type, a control command name, a control command function description, a control command, a target device ID, a command interface, and a quantity of command parameters. Such quantity includes command parameter 1, command parameter 2, and command parameter n, where n is a positive integer that is more than one. The industrial apparatus encapsulates the collected data set to form the structured target data set by adding the data ID, the data species, the custom enumeration type, the control command name, the control command function description, the control command, the target device ID, the command interface, and the quantity of command parameters.

In one embodiment, the data head 1 format includes, but is not limited to, a device ID, a device type, a device name, and a device function. The industrial apparatus encapsulates the collected data set to form the structured target data set by adding the device ID, the device type, the device name, and the device function.

At block 605, the industrial apparatus generates a 5G signal containing the structured target data set, and sends the 5G signal containing the structured target data set to a microprocessor. In one embodiment, the industrial apparatus converts a CAN BUS signal, PROFIBUS BUS signal, a MODUBUS BUS signal, an EPA BUS signal, ETHERCAT BUS signal, an ETHERNET POWERLINK BUS signal, an RS232 BUS signal, an RS485 BUS signal or a TCP/IP BUS signal containing the structured target data set into the 5G signal containing the structured target data set.

In one embodiment, the industrial apparatus also receives a second 5G signal, and converts the 5G signal into the CAN BUS signal, the PROFIBUS BUS signal, the MODUBUS BUS signal, the EPA BUS signal, the ETHERCAT BUS signal, the ETHERNET POWERLINK BUS signal, the RS232 BUS signal, the RS485 BUS signal, or the TCP/IP BUS signal.

At block 606, the microprocessor acquires the 5G signal containing the structured target data set sent by the industrial apparatus.

In one embodiment, the microprocessor acquires the 5G signal containing the structured target data set by a base station and a first communication unit of the microprocessor. In another embodiment, the base station is set in the microprocessor, and the microprocessor acquires the 5G signal containing the structured target data set by the base station set in the microprocessor.

At block 607, the microprocessor acquires the structured target data set from the 5G signal, cleans the structured target data set, and determines whether the structured target data set is compliant.

In one embodiment, the microprocessor removes redundancy, fragmentation, and noise from the structured target data set according to the preset cleaning rule algorithm. In one embodiment, the preset cleaning rule algorithm can be the removing missing value method, the mean filling method or the hot card filling method, as previously described.

In one embodiment, the microprocessor sets different compliance rules for the structured target data set from different industrial apparatus, and determines whether the structured target data set is compliant according to the corresponding compliance rule. In one embodiment, the compliance rule includes determining whether the numerical range of the structured target data set is in the preset range or determining whether the field length of the structured target data set is in the preset length. In one embodiment, the industrial apparatus determines that the structured target data set is compliant when the numerical range of the structured target data set is in the preset range and the field length of the structured target data set is in the preset length. In one embodiment, the microprocessor discards the structured target data set when the structured target data set is not compliant.

At block 608, the microprocessor determines a communication channel for the microprocessor communicating with the industrial apparatus according to an identification of the industrial apparatus carried in the structured target data set, and finds in a relationship table, based on the communication channel to determine a data processing rule, a data storage rule, and a data emission rule corresponding to the communication channel. The structured target data set is processed according to the data processing rule, the data storage rule, and the data emission rule. In one embodiment, the relationship table defines different relationships between the communication channel, the data processing rule, the data storage rule, and the data emission rule.

In one embodiment, the relationship table includes the communication channels, the data processing rules, the data storage rules, and the data emission rules, and defines the different relationships between the communication channel, the data processing rule, the data storage rule, and the data emission rule. In one embodiment, the data processing rule is a rule for processing the structured target data set. The data storage rule is a rule for storing the structured target data set or storing a data processing result obtained after processing the structured target data set according to the data processing rule. In one embodiment, the data emission rule is a rule for sending the structured target data set to a cloud platform, the industrial apparatus, or other device. In one embodiment, the structured target data set can be a temperature data sent by the industrial apparatus, and the microprocessor determines the communication channel for the microprocessor communicating with the industrial apparatus according to an identification of the industrial apparatus carried in the temperature data. The data processing rule which compares the temperature data with a preset temperature range, and sends the temperature data to the cloud platform when the temperature data is in the preset temperature range, is found and determined in the relationship table depending on the communication channel. An alarm instruction is generated when the temperature data is not in the preset temperature model, and the alarm instruction sent to an alarm device. The microprocessor finds the relationship table based on the communication channel to determine the data storage rule that stores the temperature data in the cloud platform when the temperature data is in the preset temperature range. The microprocessor finds in the relationship table the data emission rule that sends the temperature data to the cloud platform when the temperature data is within the preset temperature range.

In one embodiment, the microprocessor encapsulates the structured target data set according to a data head 2 format. The microprocessor sends the encapsulated data to the cloud platform. In one embodiment, the data head 2 format includes, but is not limited to, a product name, a project name, a process number, and a production line number. In one embodiment, the microprocessor adds the product name, the project name, the process number, and the production line number to the structured target data set. For example, for a mobile phone manufacturer producing a mobile phone, processes of the mobile phone include housing processing, electronic component assembly testing, and product packaging. The housing processing data can be acquired by a housing processing device, and the electronic component assembly testing data can be acquired by an assembly testing device. The product packaging data can be acquired by a packaging device. The microprocessor encapsulates the housing processing data according to "product name, housing processing, fifth production line", and encapsulates the electronic component assembly testing data according to "product name, electronic component assembly testing, second production line", and encapsulates the product packaging data according to "product name, product packaging, first production line". In one embodiment, the microprocessor sends the encapsulated data to the cloud platform by the network.

The cloud platform receives the structured target data set sent by the microprocessor, and encapsulates the structured target data set sent by the microprocessor according to a data head 3 format. In one embodiment, the data head 3 format includes, but is not limited to, a product type, an industry, a company name, and a company address. In one embodiment, the cloud platform 3 encapsulates the structured target data set sent by the microprocessor by adding the product type, the industry, the company name, and the company address. For example, the microprocessor sends a production and testing data from a 3D metal printing material factory in Shenzhen to the cloud platform, and the cloud platform encapsulates the production and testing data by adding "metal printing material, production, 3D metal printing material factory, Shenzhen".

In one embodiment, the microprocessor receives a control command sent by the cloud platform, and the microprocessor sends the control command by a 5G signal format to the industrial apparatus to control the industrial apparatus according to the control command.

In present disclosure, the industrial apparatus collects data, generate a 5G signal containing the data, and sends the 5G signal to the microprocessor. The microprocessor determines the communication channel for the microprocessor communicating with the industrial apparatus according to an identification of the industrial apparatus carried in the data, and finds in the relationship table, based on the communication channel, a data processing rule, a data storage rule, and a data emission rule corresponding to the communication channel. The data is processed according to the data processing rule, the data storage rule, and the data emission rule, thus enabling a safe, efficient, and convenient transmission of data between the microprocessor and the industrial devices.

Figure 7:
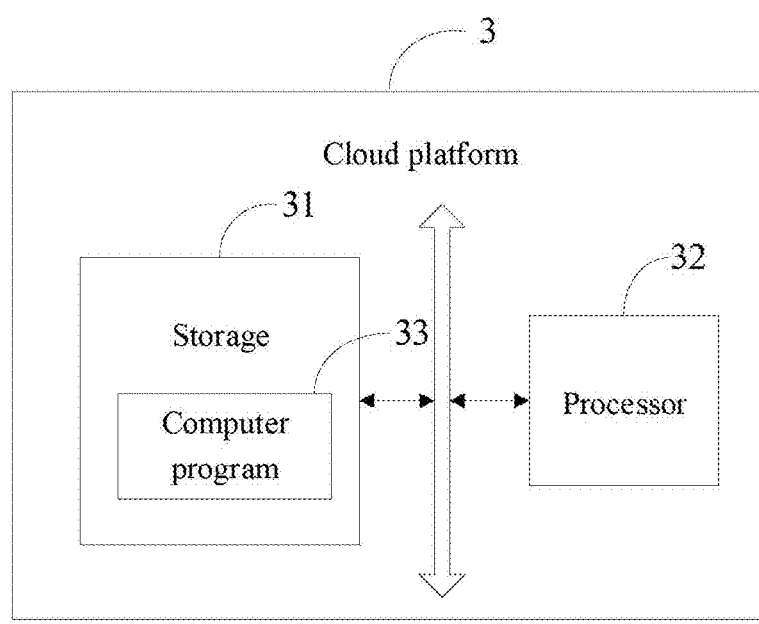
FIG. 7 is a schematic diagram of an embodiment of a cloud platform utilized in the method of FIG. 1.

FIG. 7 illustrates the cloud platform 3. The cloud platform 3 includes a storage 31, a processor 32, and a computer program 33 stored in the storage 31 and executed by the processor 32. FIG. 7 shows only an example of the cloud platform 3, no limitations of the cloud platform 3 are constituted, and other examples may include more or less components than those illustrated, or some components combined, or a different arrangement. The components, such as the cloud platform 3, may also include input devices, output devices, communication unit, network access devices, buses, and the like.

The processor 32 can be a central processing unit (CPU), and also include other general-purpose processors, a digital signal processor (DSP), and application specific integrated circuit (ASIC), Field-Programmable Gate Array (FPGA) or other programmable logic device, discrete gate or transistor logic device, discrete hardware components, etc. The general purpose processor may be a microprocessor or the processor may be any conventional processor or the like. The processor 32 is the control center of the cloud platform 3, and connects the entire cloud platform 3 by using various interfaces and lines.

The storage 31 stores data and programs of the cloud platform 3. In at least one exemplary embodiment, the storage 31 can include various types of non-transitory computer-readable storage mediums. For example, the storage 31 can be an internal storage system for eliminating adjacent channel interference, such as a flash memory, a random access memory for temporary storage of information, and/or a read-only memory for permanent storage of information. The storage 31 can also be an external storage system, such as a hard disk, a storage card, or a data storage medium.

In one embodiment, the modules/units integrated in the cloud platform 3 can be stored in a computer readable storage medium if such modules/units are implemented in the form of a product. Thus the present disclosure may be implemented and realized in any or part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file or some intermediate form. The computer readable medium may include any entity or device capable of carrying the computer program code, a recording medium, a USB flash drive, a removable hard disk, a magnetic disk, an optical disk, a computer memory, a read-only memory (ROM), random access memory (RAM), electrical carrier signals, telecommunication signals, and software distribution media.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A 5G-based communication method for an industrial apparatus implemented in the industrial apparatus and a microprocessor, the method comprising:
   the industrial apparatus collecting data to obtain a collected data set;
   the industrial apparatus cleaning the collected data set;
   the industrial apparatus determining whether the collected data set is compliant;
   the industrial apparatus encapsulating the collected data set to form a structured target data set if the collected data set is compliant;
   the industrial apparatus generating a 5G signal containing the structured target data set and sending the 5G signal containing the structured target data set to the microprocessor;
   the microprocessor acquiring the 5G signal containing the structured target data set sent by the industrial apparatus; and
   the microprocessor determining a communication channel for the microprocessor communicating with the industrial apparatus according to an identification of the industrial apparatus carried in the structured target data set, and finding a relationship table based on the communication channel to determine a data processing rule, a data storage rule and a data emission rule corresponding to the communication channel, and processing the structured target data set according to the data processing rule, the data storage rule and the data emission rule, wherein the relationship table defines different relationships between the communication channel, the data processing rule, the data storage rule and the data emission rule.

2. The 5G-based communication method for an industrial apparatus as recited in claim 1, further comprising:
   the industrial apparatus encapsulating the collected data set to form the structured target data set according to a data head 0 format and a data head 1 format, wherein the data head 0 format comprises a numerical data head 0 format and a control data head 0 format.

3. The 5G-based communication method for an industrial apparatus as recited in claim 2, wherein the numerical data head 0 format comprises a data ID, a data species, a custom enumeration type, a data name, a data description, a data group ID, a data type, a measurement unit of the collected data set, a byte length of the data, an upper limit value of the data, a center value of the data, a missing identity of the data, a default access property of the data, a data generation time, a custom data property, wherein the industrial apparatus encapsulates the collected data set to form the structured target data by adding the data ID, the data species, the custom enumeration type, the data name, the data description, the data group ID, the data type, the measurement unit of the data, the byte length of the data, the upper limit value of the data, the center value of the data, the missing identity of the data, the default access property of the data, the data generation time, and the custom data property.

4. The 5G-based communication method for an industrial apparatus as recited in claim 2, wherein the control data head 0 format includes, but is not limited to a data ID, a data species, a custom enumeration type, a control command name, a control command function description, a control command, a target device ID, a command interface, a number of command parameters, a command parameter 1, a command parameter 2, a command parameter n, wherein n is a positive integer that is more than one, wherein the industrial apparatus encapsulates the collected data set to form the structured target data set by adding the data ID, the data species, the custom enumeration type, the control command name, the control command function description, the control command, the target device ID, the command interface, the quantity of command parameters, the command parameter 1, the command parameter 2, and the command parameter n.

5. The 5G-based communication method for an industrial apparatus as recited in claim 2, wherein the data head comprises a device ID, a device type, a device name, a device function, wherein the industrial apparatus encapsulates the collected data set to form the structured target data set by adding the device ID, the device type, the device name, and the device function.

6. The 5G-based communication method for an industrial apparatus as recited in claim 2, further comprising:
the microprocessor encapsulating the structured target data set according to a data head 2 format, wherein the data head 2 format comprises a product name, a project name, a process number, and a production line number.

7. The 5G-based communication method for an industrial apparatus as recited in claim 6, further comprising:
a cloud platform receiving the structured target data set sent by the microprocessor, and encapsulating the structured target data set sent by the microprocessor according to a data head 3 format, wherein the data head 3 format comprises a product type, an industry, a company name, and a company address.

8. The 5G-based communication method for an industrial apparatus as recited in claim 1, further comprising:
the industrial apparatus removing redundancy, fragmentation or noise from the collected data set according to a preset cleaning rule algorithm, wherein the preset cleaning rule algorithm is a removing missing value method, a mean filling method or a hot card filling method.

9. The 5G-based communication method for an industrial apparatus as recited in claim 8, further comprising:
the microprocessor cleans the structured target data set and determines whether the structured target data set is compliant.

10. The 5G-based communication method for an industrial apparatus as recited in claim 9, further comprising:
the microprocessor removing redundancy, fragmentation or noise from the structured target data set according to the preset cleaning rule algorithm.

11. The 5G-based communication method for an industrial apparatus as recited in claim 9, further comprising:
the microprocessor setting different compliance rules for the structured target data set from different industrial apparatus, and determining whether the structured target data set is compliant according to a compliance rule.

12. The 5G-based communication method for an industrial apparatus as recited in claim 11, wherein the compliance rule comprises determining whether a numerical range of the structured target data set is in a preset range or determining whether a field length of the structured target data set is in the preset length.

13. The 5G-based communication method for an industrial apparatus as recited in claim 12, further comprising:
determining whether the structured target data set is compliant when the numerical range of the structured target data set is in the preset range and the field length of the structured target data set is in the preset length.

14. A microprocessor for 5G-based communication, comprising:
a processor;
a non-transitory storage medium coupled to the processor and configured to store a plurality of instructions, which causes the microprocessor to:
acquire a 5G signal containing a target data set sent by an industrial apparatus;
determine a communication channel for the microprocessor communicating with the industrial apparatus according to an identification of the industrial apparatus carried in the target data set, and find a relationship table based on the communication channel to determine a data processing rule, a data storage rule and a data emission rule corresponding to the communication channel, and process the target data set according to the data processing rule, the data storage rule and the data emission rule, wherein the relationship table defines different relationship between the communication channel, the data processing rule, the data storage rule and the data emission rule; and
encapsulating the target data set according to a data head 2 format, wherein the data head 2 format comprises a product name, a project name, a process number, and a production line number.

15. The microprocessor as recited in claim 14, wherein the plurality of instructions is further configured to cause the microprocessor to:
clean the target data set, and determine whether the target data set is compliant.

16. The microprocessor as recited in claim 15, wherein the plurality of instructions is further configured to cause the microprocessor to:
remove redundancy, fragmentation or noise from the target data set according to a preset cleaning rule algorithm, wherein the preset cleaning rule algorithm is a removing missing value method, a mean filling method or a hot card filling method.

17. The microprocessor as recited in claim 15, wherein the plurality of instructions is further configured to cause the microprocessor to:

set different compliance rules for the target data set from different industrial apparatus, and determine whether the target data set is compliant according to the corresponding compliance rule.

18. The microprocessor as recited in claim 17, wherein the compliance rule comprises determining whether the numerical range of the target data set is in the preset range or determining whether the field length of the target data set is in the preset length, the plurality of instructions is further configured to cause the microprocessor to:

determine the target data set is compliant when the numerical range of the target data set is in the preset range and the field length of the target data set is in the preset length.

\* \* \* \* \*